United States Patent
Coult et al.

[11] Patent Number: 5,883,730
[45] Date of Patent: Mar. 16, 1999

[54] OPTICAL TRANSCEIVER FOR MULTI-DIRECTIONAL AND MULTI-WAVELENGTH APPLICATIONS

[75] Inventors: David G. Coult, Bechtelsville; William Lewis Emkey, Bethlehem, both of Pa.; Alka G. Swanson, San Diego, Calif.

[73] Assignee: Lucent Technologies Inc., Murray Hill, N.J.

[21] Appl. No.: 580,672

[22] Filed: Dec. 29, 1995

[51] Int. Cl.⁶ ................................. H04B 10/00
[52] U.S. Cl. .................. 359/152; 359/127; 359/129
[58] Field of Search ................ 359/127, 129, 359/130, 131, 152, 133; 385/31, 36, 47

[56] References Cited

U.S. PATENT DOCUMENTS

| | | | |
|---|---|---|---|
| 4,244,045 | 1/1981 | Nosu et al. | 359/127 |
| 4,431,258 | 2/1984 | Fye | 359/129 |
| 4,707,064 | 11/1987 | Dobrowolski et al. | 359/127 |
| 4,726,012 | 2/1988 | Amadiev et al. | 359/131 |
| 4,767,171 | 8/1988 | Keil et al. | 359/114 |
| 5,026,131 | 6/1991 | Jannson et al. | 359/130 |
| 5,416,624 | 5/1995 | Karstensen | 359/131 |
| 5,583,683 | 12/1996 | Scobey | 359/127 |

FOREIGN PATENT DOCUMENTS

| | | | |
|---|---|---|---|
| 4308554 | 9/1994 | Germany | 359/129 |
| 0097752 | 7/1980 | Japan | 359/127 |
| 0100761 | 7/1980 | Japan | 359/127 |

Primary Examiner—Rafael Bacares

[57] ABSTRACT

An optical transceiver receives first light having a first wavelength and also receives second light having a second wavelength. The optical transceiver has a first surface for transmitting the first light along a first path and a second surface for reflecting the second light along or from the first path. The optical transceiver also receives third light having the first wavelength, and the first surface reflects the third light along a second path. The first and second surfaces may be combined as one surface.

23 Claims, 2 Drawing Sheets

OPTICAL TRANSCEIVER FOR MULTI-DIRECTIONAL AND MULTI-WAVELENGTH APPLICATIONS

BACKGROUND OF THE INVENTION

The present invention relates to transmission of light beams, and, more particularly, is directed to an optical splitter/multiplexer for switching light beams of different wavelengths in a multi-directional manner.

In communications applications, light beams are used for transmitting signals. Generally, an optical source converts an electrical signal, either digital or analog, to a suitably modulated light beam which is passed through at least one optical module to an optical detector that extracts an electrical signal from the received light beam.

Typically, a station transmits light carrying a communication signal at a first wavelength through an optical fiber to a destination, such as a home. The station also receives, through the same optical fiber, light carrying a different communication signal at the first wavelength from the home. The light beams to and from the destination do not interfere with each other over short distances. Interference is also prevented by sharing the fiber in a time division multiplexed manner.

Newer architectures for higher communication bandwidths have proposed transmission of multiple light beams at respectively different wavelengths along the same optical fiber. However, optical modules capable of accommodating multiple light beams at different wavelengths travelling in multiple directions are not readily available.

SUMMARY OF THE INVENTION

An optical transceiver according to the present invention receives first light having a first wavelength and also receives second light having a second wavelength. The optical transceiver includes a solid having a first surface for transmitting the first light along a first path, and a second surface for reflecting the second light along or from the first path.

Additionally, the optical transceiver of the present invention receives third light having the first wavelength. The first surface reflects the third light along a second path.

The first and second surfaces may be combined as one filtering surface.

DETAILED DESCRIPTION OF THE PREFERRED EMBODIMENTS

An optical transceiver according to the present disclosure directs light beams at first and second wavelengths along one path, such as an optical fiber from a station to a destination. The light at the first wavelength may be generated locally (e.g., at the station) or received from a remote source. Similarly, the light at the second wavelength can be generated locally or received from a remote source. The optical transceiver also receives a separate light beam at the first wavelength, e.g, through the optical fiber from the destination to the station, and directs this light beam to a detector.

The optical transceiver is a multiplexer, in that the light beams at the first and second wavelengths arrive from different paths, but depart along the same path.

The optical transceiver is a splitter, in that it may direct only a portion of a light beam along a particular path.

Figure 1:
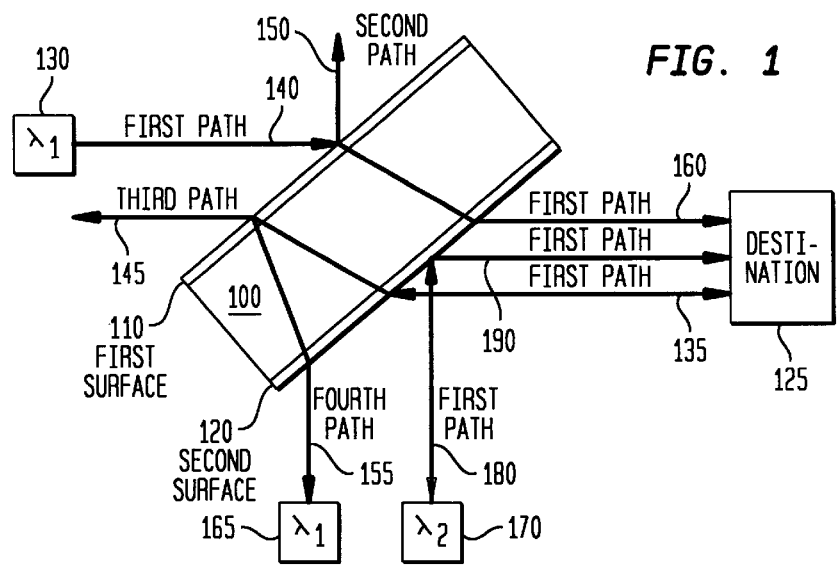
FIGS. 1–4 are diagrams of embodiments of an optical transceiver.

FIG. 1 shows an embodiment of an optical transceiver according to the present disclosure. The transceiver of FIG. 1 is assumed to be located at a station.

Solid 100 has a first surface 110 and a second surface 120. Surfaces 110 and 120 may be parallel. Solid 100 is, for example, a plate or cube formed of optically transparent material such as glass or plastic. Surface 110 is, for example, a multilayer optical filter made of materials such as titanium dioxide and silicon dioxide deposited on one side of solid 100, and surface 120 is an optical filter of similar composition deposited on another side of solid 100. Alternatively, surfaces 110 and 120 may be deposited on individual substrates and mounted individually or bonded to solid 100.

Surface 110 transmits a portion of light at wavelength $\lambda_1$ and reflects the remainder of the light at wavelength $\lambda_1$. The portions transmitted and received are balanced based on system requirements, such as the optical loss budget of the system. For presently available technology, the preferred portion is 50%, that is, surface 110 transmits approximately half of the light incident thereon at wavelength $\lambda_1$ and reflects approximately half of the light incident thereon at wavelength $\lambda_1$. However, the present disclosure is applicable to any portion between 1 and 99%. Surface 110 is preferably opaque to light at wavelengths other than $\lambda_1$, although opacity is not strictly necessary. The wavelength $\lambda_1$ may be, for example, 1.3 microns which will be understood to indicate a range, typically 1.2–1.4 microns.

Surface 120 preferably reflects substantially all of the light incident thereon at wavelength $\lambda_2$, and is transparent to light at wavelengths other than $\lambda_2$. The wavelength $\lambda_2$ may be, for example, 1.5 microns which will be understood to indicate a range, typically 1.4–1.6 microns.

Source 130 locally generates light having a wavelength of $\lambda_1$, which is directed by a lens or fiber (not shown) to a point on the surface 110 along path 140. The surface 110 reflects preferably 50% of the incident light along a second path, namely path 150 and transmits preferably 50% of the incident light along path 160 to destination 125. Alternatively, source 130 may be a remote source, such as from another station.

Module 170 forwards light having a wavelength of $\lambda_2$ to a point on the surface 120 along path 180. The surface 120 reflects substantially all of the light incident thereon at wavelength $\lambda_2$ along path 190 to destination 125. Alternatively, module 170 may be a local source of light at wavelength $\lambda_2$. It is also possible that module 170 is a detector of light at wavelength $\lambda_2$, and this is indicated by the dotted arrowheads along paths 190 and 180.

Although the paths 160 and 190 are shown as separate, for ease of illustration, one of ordinary skill in the art will appreciate that paths 160 and 190 are substantially the same, that is, paths 160 and 190 represent light beams having wavelengths $\lambda_1$ and $\lambda_2$ travelling along the same optical fiber or other medium.

Thus, surface 110 is a first surface for transmitting light having a wavelength of $\lambda_1$ along a first path, namely, path 160 and 190, and surface 120 is a second surface for reflecting light having a wavelength of $\lambda_2$ along the first path.

Destination 125 directs a light beam having a wavelength of $\lambda_1$ along path 135 to solid 100. The light beam passes through surface 120 to surface 110 of solid 100. The surface 110 reflects a portion, preferably about 50%, of the light along a forth path, namely path 155 to detector 165, and transmits the remainder of the light, i.e., the remaining 50%, along a third path, namely path 145. The light along path 135 continues on path 145 after it emerges from solid 100.

The detector 165 detects light having a wavelength of $\lambda_1$, and processes it appropriately, such as by forwarding it to another station or by recovering an electrical signal therefrom.

One of ordinary skill in the art will appreciate that light from destination 125 may travel along the same optical fiber or other medium as light to destination 125, so that paths 160, 190 and 135 are substantially the same, although paths 160 and 190 are in a downstream direction, while path 135 is in an upstream direction.

Thus, surface 110 is also for reflecting the light from destination 125 along a second path, namely, path 155.

As a modification, if surface 120 is a filter which transmits a portion of the light at wavelength $\lambda_2$, such as 50%, then bidirectional communication at wavelength $\lambda_2$ can be accomplished in similar manner to the bidirectional communication at wavelength $\lambda_1$.

Figure 2:
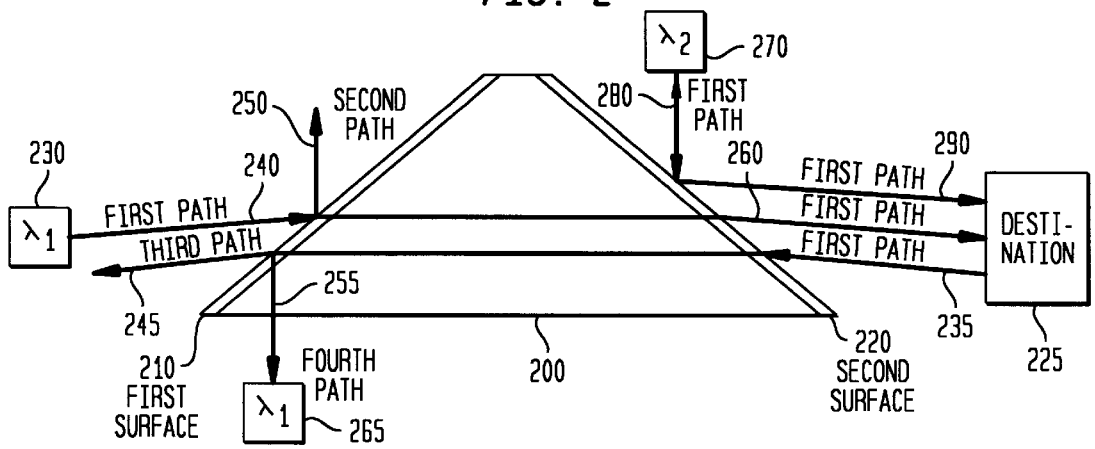

FIG. 2 shows another embodiment of an optical transceiver according to the present disclosure.

Solid 200 has a cross-section which is generally a triangle having opposed sides and a base. Solid 200 could alternatively be a trapezoid. Surfaces 210 and 220 are respectively along the opposed sides of solid 200. Generally, FIG. 2 indicates that the opposed surfaces can be angled relative to each other, and need not be parallel. Otherwise, the elements of FIG. 2 are generally the same as the correspondingly numbered elements of FIG. 1, and will not be described further for brevity.

An advantage of the configuration of solid 200 relative to the configuration of solid 100 is more flexibility for positioning of elements 265 and 270. Specifically, in FIG. 2, element 270 is on a different side of solid 200 than element 265, whereas in FIG. 1, elements 165 and 170 must be on the same side of solid 100.

Figure 3:
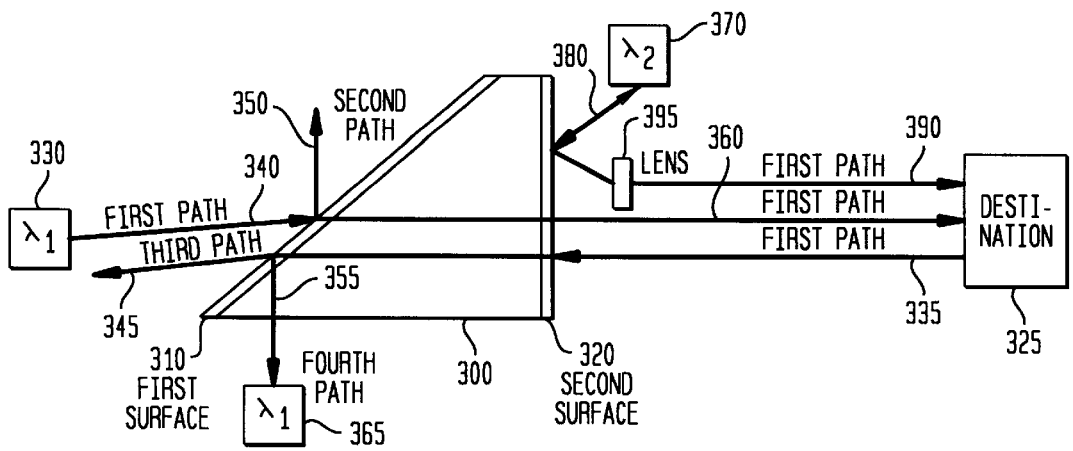

FIG. 3 shows another embodiment of an optical transceiver according to the present disclosure.

Solid 300 has a cross-section which is generally a right-angled triangle having a hypotenuse side, a base side and an upright side. Surface 310 is along the hypotenuse side. Surface 320 is along the upright side. Element 395 is a lens or other device for directing the path of light from or to module 370. Otherwise, the elements of FIG. 3 are generally the same as the correspondingly numbered elements of FIG. 1, and will not be described further for brevity.

An advantage of the configuration of solid 300 is that it is relatively easy to manufacture, since surface 320 is at a right angle relative to the base.

Figure 4:
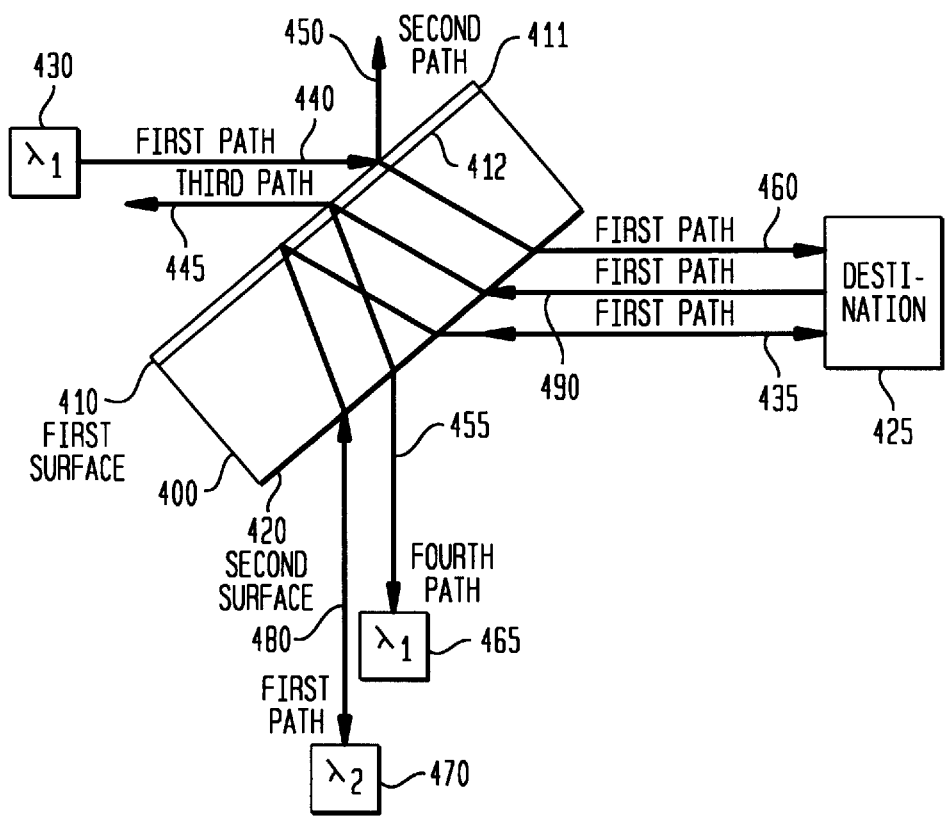

FIG. 4 shows another embodiment of an optical transceiver according to the present disclosure.

Solid 400 is generally similar to solid 100. However, surface 410 is the only optical filter on solid 400. Surface 410 is seen to have a topside 411 and an underside 412. Surface 420 is not an optical filter, although it may be anti-reflection coated. Otherwise, the elements of FIG. 4 are generally the same as the correspondingly numbered elements of FIG. 1, and will not be described further for brevity.

Figure 5A:
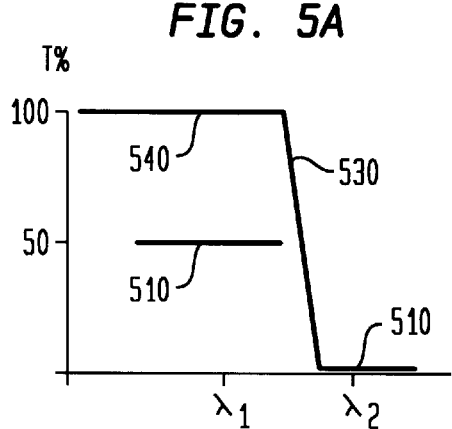
FIGS. 5A and 5B are charts referred to in explaining the operation of the embodiments of FIGS. 1 and 4.

FIG. 5A shows a diagram of wavelength (abscissa) versus transmission percent (ordinate) for surfaces 110 and 120 of FIG. 1. Surface 110 transmits approximately 50% of the light incident thereon at wavelength $\lambda_1$, as illustrated by segment 510, so surface 110 is a beam splitter. Surface 120 transmits all of the light incident thereon at wavelength $\lambda_1$, as illustrated by segment 540, and reflects substantially all of the light incident thereon at wavelength $\lambda_2$, as illustrated by segment 520. Since surface 120 has a relatively sharp drop between fully transmissive and fully reflective, as illustrated by segment 530, surface 120 is a short wave pass edge filter.

Figure 5B:
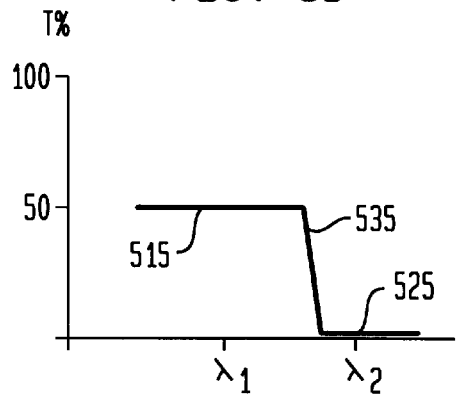

FIG. 5B shows a diagram of wavelength (abscissa) versus transmission percent (ordinate) for surface 410 of FIG. 4. Surface 410 transmits approximately 50% of the light incident thereon at wavelength $\lambda_1$, as illustrated by segment 515, and reflects substantially all of the light incident thereon at wavelength $\lambda_2$, as illustrated by segment 525.

As a modification, if surface 410 is a filter which transmits a portion of the light at wavelength $\lambda_2$, such as 50%, then bidirectional communication at wavelength $\lambda_2$ can be accomplished in similar manner to the bidirectional communication at wavelength $\lambda_1$.

Modules 170, 270, 370, 470 are shown as sources of light at wavelength $\lambda_2$, and have been indicated as alternatively being detectors of light at wavelength $\lambda_2$. It is also possible that modules 170, 270, 370, 470 can be configured to send, then receive, then send, and so on.

Although not shown, it will be understood that more than two wavelengths can be accommodated by using additional filters.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An optical transceiver, comprising:
   means for receiving first light having a first wavelength,
   means for receiving second light having a second wavelength, and
   a solid having first and second surfaces, the first surface being distinct from the second surface, the first surface for transmitting the first light along a first path, and the second surface for reflecting the second light along the first path.

2. The optical transceiver of claim 1, further comprising a source for generating the first light.

3. The optical transceiver of claim 1, wherein the first surface transmits a first portion of the first light.

4. An optical transceiver, comprising:
   means for receiving first light having a first wavelength,
   means for receiving second light having a second wavelength, and
   a solid having first and second surfaces, the first surface being distinct from the second surface, the first surface for transmitting the first light along a first path, and the second surface for reflecting the second light along the first path, wherein the first surface transmits a first portion of the first light and wherein the first portion is approximately 50%.

5. The optical transceiver of claim 1, wherein the second surface reflects a second portion of the second light.

6. The optical transceiver of claim 5, wherein the second portion is approximately 100%.

7. An optical transceiver, comprising:

means for receiving first light having a first wavelength, means for receiving second light having a second wavelength, and a solid having first and second surfaces, the first surface being distinct from the second surface, the first surface for transmitting the first light along a first path, and the second surface for reflecting the second light along the first path, further comprising means for receiving third light having the first wavelength, and wherein the first surface is also for reflecting the third light along a second path.

8. The optical transceiver of claim 7, further comprising a detector for detecting the reflected third light.

9. The optical transceiver of claim 7, wherein the first surface reflects a third portion of the third light.

10. The optical transceiver of claim 9, wherein the third portion is approximately 50%.

11. The optical transceiver of claim 1, wherein the first and second surfaces are parallel.

12. The optical transceiver of claim 1, wherein the solid has a cross-section with opposed sides angled relative to each other, and the first and second surfaces are respectively along the opposed sides.

13. An optical transceiver, comprising:

means for receiving first light having a first wavelength, means for receiving second light having a second wavelength, and a solid having first and second surfaces, the first surface being distinct from the second surface, the first surface for transmitting the first light along a first path, and the second surface for reflecting the second light along the first path, wherein the solid has a cross-section which is generally a right-angled triangle having a hypotenuse side, a base side and an upright side, and wherein the first surface is along the hypotenuse side and the second surface is along the upright side.

14. An optical transceiver, comprising:

means for receiving first light having a first wavelength, means for receiving second light having a second wavelength, and a solid having first and second surfaces, the first surface being distinct from the second surface, the first surface for transmitting the first light along a first path, and the second surface for reflecting the second light from the first path.

15. An optical transceiver, comprising:

means for receiving first light having a first wavelength, means for receiving second light having a second wavelength, and a solid having first and second surfaces, the first surface being distinct from the second surface, the first surface for transmitting the first light along a first path, and the second surface for reflecting the second light from the first path, further comprising means for receiving third light having the first wavelength, and wherein the first surface is also for reflecting the third light along a second path.

16. An optical transceiver, comprising:

means for receiving first light having a first wavelength, means for receiving second light having a second wavelength, means for receiving third light having said first wavelength, and a solid having a filtering surface, with a topside and an underside, the filtering surface for transmitting a portion of the first light incident on the topside along a first path, reflecting the remainder of the first light incident on the topside along a second path, transmitting a portion of the third light incident on the underside along a third path, reflecting the remainder of the third light incident on the underside along a fourth path, and reflecting the second light along the first path or the fourth path.

17. The optical transceiver of claim 16, further comprising means for receiving third light having the first wavelength, and wherein the filtering surface is also for reflecting the third light along a second path.

18. An optical transceiver, comprising:

means for receiving first light having a first wavelength, means for receiving second light having a second wavelength, and a solid having first and second surfaces, the first surface being distinct from the second surface, the first surface for transmitting the first light along a first path, and the second surface for reflecting the second light along the first path, wherein the first surface also transmits third light having the first wavelength from the first path along a third path and the second surface is also for reflecting fourth light having the second wavelength from the first path along a fourth path.

19. The optical transceiver of claim 18, wherein the first surface transmits only a portion of the first light along the third path.

20. An optical transceiver, comprising:

means for receiving first light having a first wavelength, means for receiving second light having a second wavelength, and a solid having first and second surfaces, the first surface being distinct from the second surface, the first surface for transmitting the first light along a first path, and the second surface for reflecting the second light from the first path, wherein the first surface also transmits third light having the first wavelength from the first path along a third path.

21. The optical transceiver of claim 20 wherein the first surface transmits only a portion of the first light along the third path.

22. An optical transceiver comprising:

means for receiving a first light having a first wavelength;

means for receiving a second light having a second wavelength;

a solid having first and second surfaces, the first surface being distinct from the second surface, the first surface for transmitting the first light along a first path and the second surface for reflecting the second light along a second path.

23. The optical transceiver of claim 22, wherein the first surface transmits only a portion of the first light along the first path.

* * * * *